US012585285B2

(12) United States Patent
Sadhu et al.

(10) Patent No.: US 12,585,285 B2
(45) Date of Patent: Mar. 24, 2026

(54) ROBOTIC NAVIGATION WITH SIMULTANEOUS LOCAL PATH PLANNING AND LEARNING

(71) Applicant: Tata Consultancy Services Limited, Mumbai (IN)

(72) Inventors: Arup Kumar Sadhu, Kolkata (IN); Lokesh Kumar, Kolkata (IN); Ranjan Dasgupta, Kolkata (IN); Mohit Ludhiyani, Kolkata (IN); Titas Bera, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 160 days.

(21) Appl. No.: 18/417,504

(22) Filed: Jan. 19, 2024

(65) Prior Publication Data

US 2024/0319735 A1     Sep. 26, 2024

(30) Foreign Application Priority Data

Mar. 24, 2023    (IN) ............................ 202321021088

(51) Int. Cl.
    *G05D 1/229*     (2024.01)
    *G05D 1/246*     (2024.01)
    *G05D 101/15*     (2024.01)

(52) U.S. Cl.
    CPC ........... *G05D 1/229* (2024.01); *G05D 1/2469* (2024.01); *G05D 2101/15* (2024.01)

(58) Field of Classification Search
    CPC ... G05D 1/229; G05D 1/2469; G05D 2101/15
    See application file for complete search history.

(56) References Cited

U.S. PATENT DOCUMENTS

2022/0187841 A1     6/2022    Ebrahimi Afrouzi et al.

FOREIGN PATENT DOCUMENTS

| CN | 108829134 A | * 11/2018 | ............... G05D 1/10 |
| CN | 112506199 A | 3/2021 | |

(Continued)

OTHER PUBLICATIONS

CN 108829134 translation (Year: 2018).*

(Continued)

*Primary Examiner* — Aniss Chad
*Assistant Examiner* — Joshua Jeffrey Penko
(74) *Attorney, Agent, or Firm* — Finnegan, Henderson, Farabow, Garrett & Dunner, LLP

(57) ABSTRACT

In conventional robot navigation techniques learning and planning algorithms act independently without guiding each other simultaneously. A method and system for robotic navigation with simultaneous local path planning and learning is disclosed. The method discloses an approach to learn and plan simultaneously by assisting each other and improve the overall system performance. The planner acts as an actuator and helps to balance exploration and exploitation in the learning algorithm. The synergy between dynamic window approach (DWA) as a planning algorithm and a disclosed Next best Q-learning (NBQ) as a learning algorithm offers an efficient local planning algorithm. Unlike the traditional Q-learning, dimension of Q-tree in the NBQ is dynamic and does not require to define a priori.

6 Claims, 12 Drawing Sheets

(56) References Cited

FOREIGN PATENT DOCUMENTS

| CN | 114564016 A | * | 5/2022 | ........... | G05D 1/0223 |
| IN | 202121026458 | | 12/2022 | | |

OTHER PUBLICATIONS

CN 114564016 translation (Year: 2022).* https://towardsdatascience.com/reinforcement-learning-explained-visually-part-3-model-free-solutions-step-by-step-c4bbb2b72dcf/ (Year: 2020).*

Chang et al., "Reinforcement based mobile robot path planning with improved dynamic window approach in unknown environment," Autonomous Robots, 45:51-76 (2021).

Fethi et al., "Simultaneous localization, mapping, and path planning for unmanned vehicle using optimal control," Advances in Mechanical Engineering, 10(1):1-25 (2018).

Guo, "A Modified Q-learning Algorithm for Robot Path Planning in a Digital Twin Assembly System," University of Southern California (2021).

Kobayashi et al., "Local Path Planning: Dynamic Window Approach With Virtual Manipulators Considering Dynamic Obstacles," (2022).

Lei et al., "Dynamic Path Planning of Unknown Environment Based on Deep Reinforcement Learning," Journal of Robotics (2018).

Mai et al., "An improved dynamic window approach for local trajectory planning in the environment with dense objects," Journal of Physics (2021).

* cited by examiner

200 performing by a robotic agent a global path planning to obtain a plurality of way points to reach a goal position based on a current position, the goal position and 2D floor plan of an environment the robotic agent is deployed into, wherein the current position of the robotic agent represents a current way point    202 sequentially navigating by the robotic agent, through each of the plurality of way points to reach the goal position by simultaneously applying a) a Dynamic Window Approach (DWA) for local path planning, and b) a Next best Q-learning (NBQ), the steps comprising:    204 computing an optimal velocity vector for a local goal evaluated for the current way point at a current state among a plurality of states visited by the robotic agent    204a employing, by the robotic agent, one of an exploration approach and an exploitation approach for a local path planning based on a value of the optimal velocity vector, wherein i) the exploration approach is followed if the optimal velocity vector is empty, wherein value of a scalar parameter, required to tune a number of linear velocity samples and a number of angular velocity samples, is set to zero during exploration; and ii) the exploitation approach is followed if the optimal velocity vector is not-empty, wherein value of the tuning scalar parameter is set to be greater than zero and less than one during exploitation    204b

FIG. 2A

(b) World 2 (Typical warehouse)

(a) World 1 (zigzag)

(a) World 3 for experiment     (b) 2D local cost map of world 3

ROBOTIC NAVIGATION WITH SIMULTANEOUS LOCAL PATH PLANNING AND LEARNING

PRIORITY CLAIM

This U.S. patent application claims priority under 35 U.S.C. § 119 to: Indian Patent Application No. 202321021088, filed on Mar. 24, 2023. The entire contents of the aforementioned application are incorporated herein by reference.

TECHNICAL FIELD

The embodiments herein generally relate to the field of robot navigation and, more particularly, to a method and system for robotic navigation with simultaneous local path planning and learning.

BACKGROUND

Online planning or offline learning based planning is the key for any successful navigation from a given position to another in a robotic environment. Online planning suffers from repeated planning for minor positional modifications. Learning circumvents this repeated planning by learning the action (e.g., velocity vector) for the minor positional modifications. Unfortunately, the learning algorithms either works in offline or requires a priori training data. Thus, in conventional robot navigation techniques learning and planning algorithms act independently without guiding each other simultaneously.

SUMMARY

Embodiments of the present disclosure present technological improvements as solutions to one or more of the above-mentioned technical problems recognized by the inventors in conventional systems. For example, in one embodiment, a method for robotic navigation with simultaneous local path planning and learning is provided. The method includes performing by a robotic agent a global path planning to obtain a plurality of way points to reach a goal position based on a current position, the goal position and two-dimensional (2D) floor plan of an environment the robotic agent is deployed into, wherein the current position of the robotic agent represents a current way point. Further, the method includes sequentially navigating, by the robotic agent, through each of the plurality of way points to reach the goal position by simultaneously applying a) a Dynamic Window Approach (DWA) for a local path planning, and b) a Next best Q-learning (NBQ) approach that enables real-time learning while balancing between an exploitation approach and an exploration approach, wherein sequentially navigating through each of the plurality of way points to reach the goal position comprises iteratively performing a plurality of steps until the plurality of way points are covered, the plurality of steps comprising: (a) computing an optimal velocity vector for a local goal evaluated for the current way point at a current state among a plurality of states visited by the robotic agent; (b) employing, by the robotic agent, one of an exploration approach and an exploitation approach for the local path planning based on the optimal velocity vector (204b), wherein the exploration approach is followed if the optimal velocity vector is empty, wherein value of a scalar parameter, required to tune a number of linear velocity samples and a number of angular velocity samples, is set to zero during the exploration approach; and the exploitation approach is followed if the optimal velocity vector is not-empty, wherein value of the tuning scalar parameter is set to be greater than zero and less than one during the exploitation approach; (c) computing the number of linear velocity samples and the number of angular velocity samples at each of the plurality of states based on value set for the scalar parameter; (d) obtaining the optimal velocity vector and a score value for each velocity sample offered by the DWA, based on the current state, the local goal, the number of linear velocity samples, and the number of angular velocity samples; (e) evaluating a reward using a predefined reward function and updating a Q-value of a Q-tree; and (f) recomputing the optimal velocity vector at the current state with the updated Q-tree and executing the optimal velocity vector to update the current waypoint by current position of the robotic agent.

In another aspect, a system for robotic navigation with simultaneous local path planning and learning is provided. The system, also referred to as a robotic agent, comprises a memory storing instructions; one or more Input/Output (I/O) interfaces; and one or more hardware processors coupled to the memory via the one or more I/O interfaces, wherein the one or more hardware processors are configured by the instructions to perform a global path planning to obtain a plurality of way points to reach a goal position based on a current position, the goal position and two-dimensional (2D) floor plan of an environment the robotic agent is deployed into, wherein the current position of the robotic agent represents a current way point. Further, the robotic agent sequentially navigates through each of the plurality of way points to reach the goal position by simultaneously applying a) a Dynamic Window Approach (DWA) for a local path planning, and b) a Next best Q-learning (NBQ) approach that enables real-time learning while balancing between an exploitation approach and an exploration approach, wherein sequentially navigating through each of the plurality of way points to reach the goal position comprises iteratively performing a plurality of steps until the plurality of way points are covered, the plurality of steps comprising: (a) computing an optimal velocity vector for a local goal evaluated for the current way point at a current state among a plurality of states visited by the robotic agent; (b) employing, by the robotic agent, one of an exploration approach and an exploitation approach for the local path planning based on the optimal velocity vector (204b), wherein the exploration approach is followed if the optimal velocity vector is empty, wherein value of a scalar parameter, required to tune a number of linear velocity samples and a number of angular velocity samples, is set to zero during the exploration approach; and the exploitation approach is followed if the optimal velocity vector is not-empty, wherein value of the tuning scalar parameter is set to be greater than zero and less than one during the exploitation approach; (c) computing the number of linear velocity samples and the number of angular velocity samples at each of the plurality of states based on value set for the scalar parameter; (d) obtaining the optimal velocity vector and a score value for each velocity sample offered by the DWA based on the current state, the local goal, the number of linear velocity samples, and the number of angular velocity samples; (e) evaluating a reward using a predefined reward function and updating a Q-value of a Q-tree; and (f) recomputing the optimal velocity vector at the current state with the updated Q-tree and executing the optimal velocity vector to update the current waypoint by current position of the robotic agent.

In yet another aspect, there are provided one or more non-transitory machine-readable information storage mediums comprising one or more instructions, which when executed by one or more hardware processors causes a method for robotic navigation with simultaneous local path planning and learning. The method includes performing by a robotic agent a global path planning to obtain a plurality of way points to reach a goal position based on a current position, the goal position and two-dimensional (2D) floor plan of an environment the robotic agent is deployed into, wherein the current position of the robotic agent represents a current way point. Further, the method includes sequentially navigating, by the robotic agent, through each of the plurality of way points to reach the goal position by simultaneously applying a) a Dynamic Window Approach (DWA) for a local path planning, and b) a Next best Q-learning (NBQ) approach that enables real-time learning while balancing between an exploitation approach and an exploration approach, wherein sequentially navigating through each of the plurality of way points to reach the goal position comprises iteratively performing a plurality of steps until the plurality of way points are covered, the plurality of steps comprising: (a) computing an optimal velocity vector for a local goal evaluated for the current way point at a current state among a plurality of states visited by the robotic agent; (b) employing, by the robotic agent, one of an exploration approach and an exploitation approach for the local path planning based on the optimal velocity vector ($204b$), wherein the exploration approach is followed if the optimal velocity vector is empty, wherein value of a scalar parameter, required to tune a number of linear velocity samples and a number of angular velocity samples, is set to zero during the exploration approach; and the exploitation approach is followed if the optimal velocity vector is not-empty, wherein value of the tuning scalar parameter is set to be greater than zero and less than one during the exploitation approach; (c) computing the number of linear velocity samples and the number of angular velocity samples at each of the plurality of states based on value set for the scalar parameter; (d) obtaining the optimal velocity vector and a score value for each velocity sample offered by the DWA based on the current state, the local goal, the number of linear velocity samples, and the number of angular velocity samples; (e) evaluating a reward using a predefined reward function and updating a Q-value of a Q-tree; and (f) recomputing the optimal velocity vector at the current state with the updated Q-tree and executing the optimal velocity vector to update the current waypoint by current position of the robotic agent.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 2A through 2B (collectively referred as FIG. 2) is a flow diagram illustrating a method for robotic navigation with simultaneous local path planning and learning, using the system depicted in FIG. 1A and FIG. 1B, in accordance with some embodiments of the present disclosure.

FIGS. 3B and 3C depict two simulation worlds experienced by the robotic agent during navigation towards a goal position, in accordance with some embodiments of the present disclosure.

Figure 1A:
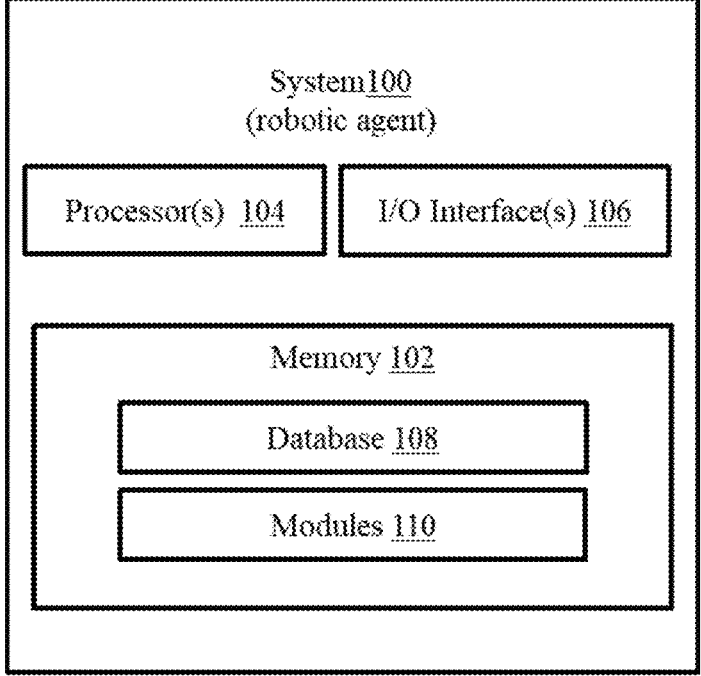
FIG. 1A is a functional block diagram of a system, interchangeably referred to as a robotic agent, for robotic navigation with simultaneous local path planning and learning, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Path planning for a mobile robot is the process of finding a sequence of valid collision-free configurations to transport the mobile robot from one position to another. Global path planning algorithm offers path between start and goal on a given world in offline. In order to deal with the environmental uncertainties (e.g., amendment of stationary object/obstacle in the world), global planner requires frequent replanning. Hence, global planners are computationally expensive. On the other hand, a local planner works on local environment, which is created locally within sensing range, and does not include any global information. Hence, the robot may be stuck in local minima as shown by state-of-the art. However, the computational cost of the local path planning algorithm is less as compared to the global path planning algorithm. Naturally, the local path planning algorithms in the art are capable enough to deal with frequent changes in the surroundings. One of the initial local path planning approaches is introduced as a curvature velocity method. The basics of the curvature velocity method is maximizing an objective function by choosing one suitable velocity sample (satisfying necessary constraints) from a velocity space. Based on the curvature velocity method, the concept of dynamic window approach (DWA) is derived by another existing work. The dynamic window is defined on the basis of the kinematics model and current velocity of the robot. A score is computed by selecting each velocity sample from the dynamic window as a function of robot's goal heading, velocity, and distance from the nearest obstacle. The velocity sample with maximum score value is selected for execution. Improvement of DWA is done by another existing method for better navigation capabilities in partially unknown environments among obstacles. Some works further proposed a Global DWA in order to avoid trapping in local minima. Besides several improvements of DWA, following technical limitations of DWA are specified in the literature. Firstly, the evaluation functions are not sufficient to identify potential velocity sample in the dynamic window. Hence, potential velocity sample may be ignored. Secondly, the score function is weighted sum of evaluation functions, and performance of the DWA highly depends on the choice of weight values. Former hindrances are circumvented by employing reinforcement learning and by deep reinforcement learning in the recent works in the art. However, these recent approaches require offline learning or training with a priori training data. Additionally, dimension of Q-table is defined a priori in the works in literature. To circumvent the said bottleneck (i.e., offline learning, a priori training data for learning and predefined Q-table dimension) of learning algorithm, simultaneous learning and planning algorithm (SLPA) is proposed in the art. However, the SLPA works for a fixed start and goal pair and needs to reinitialize if start and/or goal are/is altered. On the other hand, in local planning start and local goal keep on changing. So, local planning by employing SLPA is not feasible.

Embodiments herein disclose a method and system for robotic navigation with simultaneous local path planning and learning by a robotic agent. The method discloses an approach that enables the robotic agent, also referred as mobile robot or robot interchangeably, to learn and plan simultaneously, based on SLPA in sensing range (SLPA-SR) approach, a wherein learning and planning techniques are synergistically combined to assist each other and improve the overall navigational performance of the robot. The planner acts as an actuator and helps to balance exploration and exploitation in the learning algorithm. The synergy between dynamic window approach (DWA) as a planning technique and a disclosed Next best Q-learning (NBQ) as a learning technique offers an efficient local planning approach. Further, unlike the traditional Q-learning, dimension of Q-tree in the NBQ is dynamic and does not require to define a priori.

Referring now to the drawings, and more particularly to FIGS. 1A through 9, where similar reference characters denote corresponding features consistently throughout the figures, there are shown preferred embodiments and these embodiments are described in the context of the following exemplary system and/or method.

FIG. 1A is a functional block diagram of a system 100, interchangeably referred to as a robotic agent 100, for robotic navigation with simultaneous local path planning and learning, in accordance with some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100. Further the robotic agent is integrated with a sensor, for example a light detection and ranging LiDAR, (not shown) to sense the environment of the robot during navigation towards a goal position.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 1B:
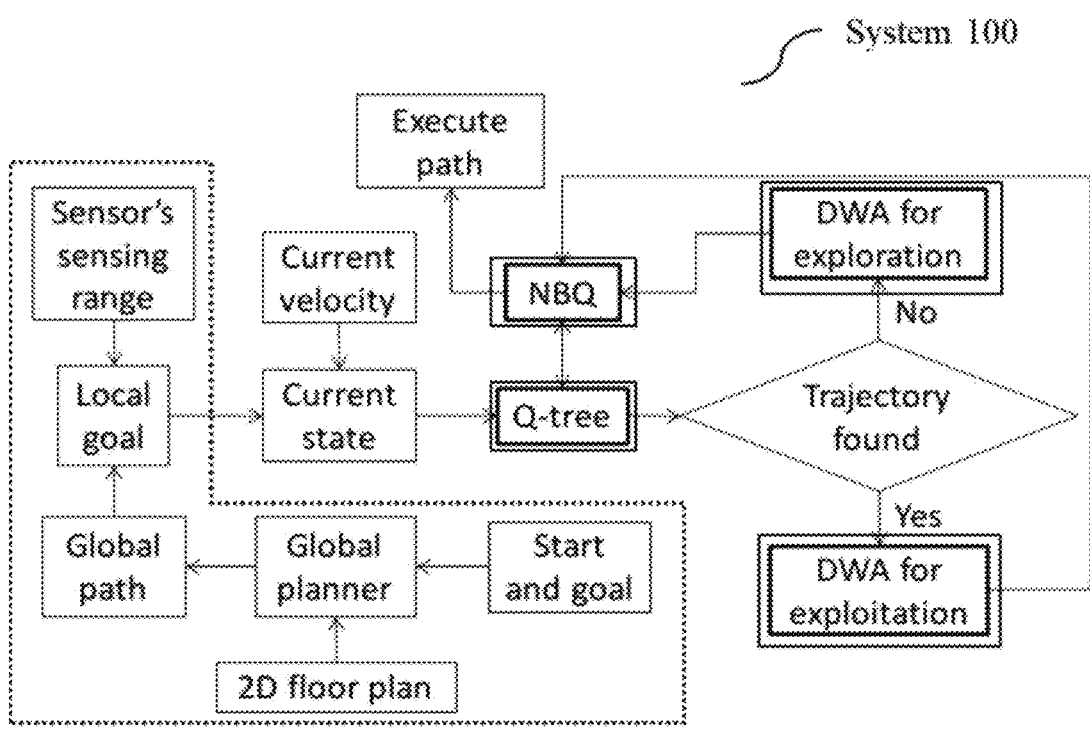
FIG. 1B illustrates a high level process flow of the system of FIG. 1A, in accordance with some embodiments of the present disclosure.

In an embodiment, the memory 102 includes a plurality of modules 110. The plurality of modules 110 include programs or coded instructions that supplement applications or functions performed by the system 100 for executing different steps involved in the process of robotic navigation with simultaneous local path planning and learning, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown) such as modules executing the DWA and the NBQ as depicted in FIG. 1B. Further, the memory 102 may comprise information pertaining to input(s)/output(s) of each step performed by the processor(s) 104 of the system 100 and methods of the present disclosure. Further, the memory 102 includes a database 108. The database (or repository) 108 may include a plurality of abstracted piece of code for refinement and data that is processed, received, or generated as a result of the execution of the plurality of modules in the module(s) 110, for example, a 2D floor plan, a goal position, a plurality of way points to reach the goal positions, the Q-tree, the local goals, a plurality of states visited by the robotic agent and so on. Although the data base 108 is shown internal to the system 100, it will be noted that, in alternate embodiments, the database 108 can also be implemented external to the system 100, and communicatively coupled to the system 100. The data contained within such external database may be periodically updated. For example, new data may be added into the database (not shown in FIG. 1A) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to FIG. 1B through FIG. 9.

FIG. 1B illustrates high level process flow of the system 100 of FIG. 1A, in accordance with some embodiments of the present disclosure.

Figure 2B:
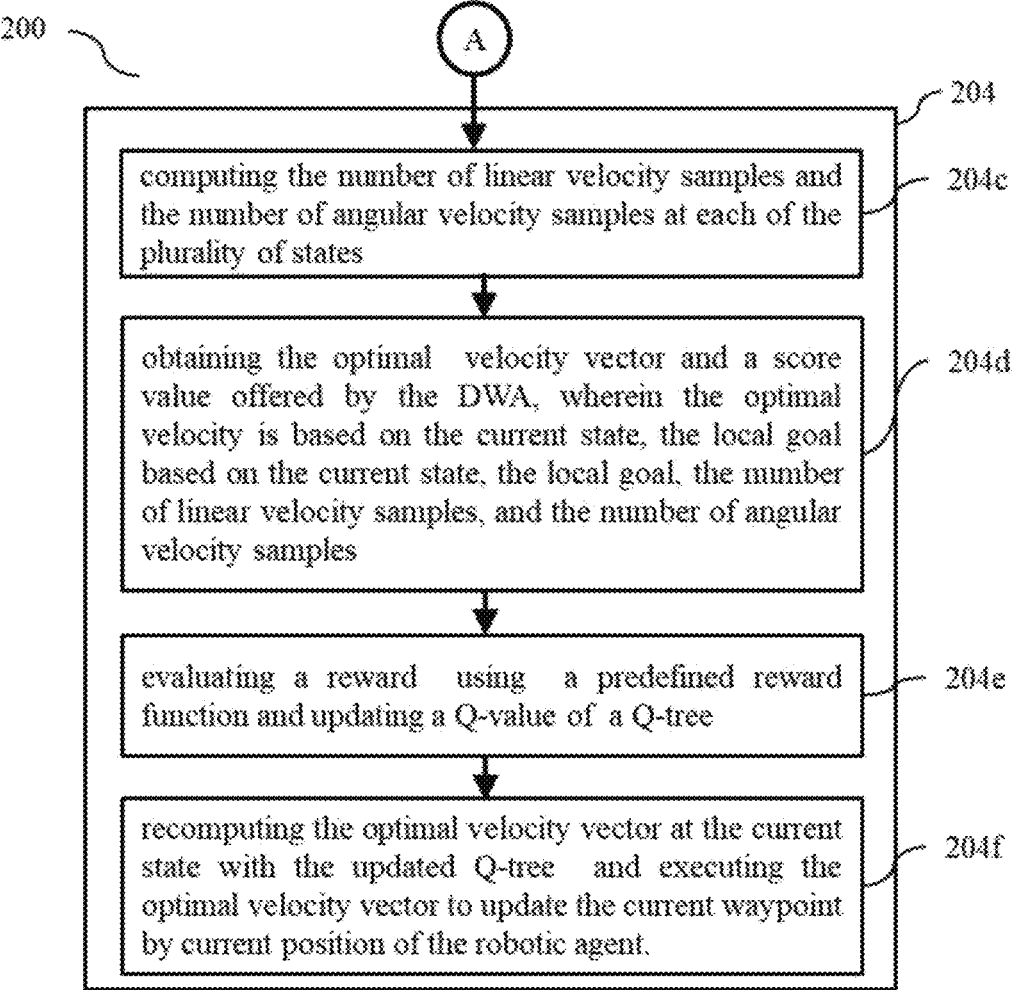

FIGS. 2A through 2B (collectively referred as FIG. 2) is a flow diagram illustrating a method 200 for robotic navigation with simultaneous local path planning and learning, using the system depicted in FIG. 1A and FIG. 1B, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1A and FIG. 1B and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202 of the method 200, the robotic agent 100, executed by one or more hardware processors 104, perform a global path planning to obtain a plurality of way points to reach a goal position based on a current position, the goal position and two-dimensional (2D) floor plan of an environment the robotic agent is deployed into, wherein the current position of the robotic agent represents a current way point.

At step 204 of the method 200, of the robotic agent 100, executed by the one or more hardware processors 104, sequentially navigates through each of the plurality of way points to reach the goal position by simultaneously applying a) a Dynamic Window Approach (DWA) for a local path planning, and b) a Next best Q-learning (NBQ) approach that enables real-time learning while balancing between an exploitation approach and an exploration approach. Sequentially navigating through each of the plurality of way points to reach the goal position comprises iteratively performing a plurality of steps (204*a* though 204*f* as listed below) until the plurality of way points are covered.

a) Computing an optimal velocity vector for a local goal evaluated for the current way point at a current state among a plurality of states visited by the robotic agent (204*a*). Each of the plurality of states is a tuple comprising a sector within sensing range of the sensor (for example, a LIDAR) attached to the robotic agent, a current linear velocity of the robotic agent, and a current angular velocity of the robotic agent.

b) Employing, by the robotic agent, one of an exploration approach and an exploitation approach for the local path planning based on the optimal velocity vector (204*b*). Further, i) The exploration approach is followed if the optimal velocity vector is empty. Value of a scalar parameter, required to tune a number of linear velocity samples and a number of angular velocity samples, is set to zero during the exploration approach.

ii) The exploitation approach is followed if the optimal velocity vector is not-empty, The value of the scalar parameter is set to be greater than zero and less than one during the exploitation approach;

c) Computing the number of linear velocity samples and the number of angular velocity samples at each of the plurality of states based on value set for the scalar parameter (204*c*).

d) Obtaining the optimal velocity vector and a score value for each velocity sample offered by the DWA based on the current state, the local goal, the number of linear velocity samples, and the number of angular velocity samples (204*d*).

e) Evaluating a reward using a predefined reward function and updating a Q-value of a Q-tree (204*e*). The Q-value adapts based on one or more uncertainties in the environment. The Q-value is summation of immediate reward and discounted next best Q-value. An alpha is the learning rate to balance between an old and a new Q-value. The dimension of the Q-tree in the NBQ is dynamically obtained without need to define a priori.

f) Recomputing the optimal velocity vector at the current state with the updated Q-tree and executing the optimal velocity vector to update the current waypoint by current position of the robotic agent (204*f*).

Thus, method 200 employs synergistic combination of the DWA for planning and the disclosed NBQ for learning. In NBQ, a state is the tuple consisting of sector within sensing range of the sensor attached to the robotic agent (robot) and current velocity vector of the robotic agent. Action is the velocity sample chosen from the dynamic window. Unlike traditional DWA, the number of linear and angular velocity samples are computed by the disclosed action selection strategy. For each velocity sample one score value is computed, ignoring the robot's distance from the nearest obstacle which is captured by the rewarding mechanism in the NBQ. The computed Q-values in the NBQ can adapt dynamically based on the environmental uncertainties. Over the iteration, requirement of the DWA is reduced and robot becomes more dependent on the learned NBQ-values for optimal velocity sample selection at current state.

The method 200 is now explained with reference to FIG. 1B with supporting mathematical explanation and pseudo-code.

PRELIMINARIES: Considering dynamic window approach (DWA) [as the planning algorithm] and the disclosed NBQ-learning as learning algorithm, the preliminaries section briefly explains the DWA to improve legibility. The DWA generates linear velocity (v) and angular velocity ($\omega$) to control a robot for a finite sampling time, say $\Delta t$. The selection of optimal velocity vector: $(v^*, \omega^*)$ from a set of velocity vectors is twofold. First fold is about generating the set of feasible velocity vectors, $V_r$. Second fold is about the selection of $(v^*, \omega^*)$ from $V_r$.

1) Generating feasible velocity space: Feasible velocity space is denoted by $V_r = V_s \cap V_d \cap V_{ad}$, where $V_s$, $V_d$ and $V_{ad}$ are velocity space satisfies condition 1, condition 2 and condition 3 respectively.

Condition 1: After pruning complete velocity vectors by $v_{min} \le v \le v_{max}$ and $\omega_{min} \le \omega \le \omega_{max}$ the remained velocity vector is referred as $V_s$. Here, max and min in the suffix of nomenclature are the corresponding maximum and minimum limitation respectively.

Condition 2: The set of velocity vectors $V_d$ reachable from robot's current velocity vector $(v_a, \omega_a)$ within time horizon $\Delta t$ is defined by $v_a - a_{max}\Delta t \le v \le v_a + a_{max}\Delta t$ and $\omega_a - \alpha_{max}\Delta t \le \omega \le \omega_a + \alpha_{max}\Delta t$ and is also named as dynamic window. Here, $a_{max}$ and $\alpha_{max}$ are the maximum possible linear and angular accelerations respectively for the robot.

Condition 3: The admissible velocity vectors $V_{ad}$ is the collection of collision free velocity vectors by satisfying $v \le \sqrt{2dist(v,\omega)v'_b}$ and $\omega \le \sqrt{2dist(v,\omega)\omega'_b}$. Here, $dist(v,\omega)$ represents the distance between the nearest obstacle and robot's predicted path corresponding to $(v,\omega)$, wherein $v'_b$ and $\omega'_b$ are the accelerations for breakage.

2) Selecting the optimal velocity vector from $V_r$: Let, $V_r$ consists of $N_{vr}$ as linear and $N_{wr}$ as angular velocity samples. Total velocity samples $N_r$ can be represented as a $N_{vr} \times N_{\omega r}$ window. For each velocity sample, $(v,\omega)$ a score function $J(v,\omega)$ is evaluated by equation (1) below.

$$J(v, \omega) = \qquad\qquad \text{equation (1)}$$
$$\sigma \times (\alpha' \times \text{angle}(v, \omega) + \gamma' \times \text{velocity}(v, \omega) + \beta \times dist(v, \omega)),$$

where, angle $(v,\omega)$ measures the robot's progression towards the goal, the velocity $(v,\omega)$ function checks that $v \neq 0$, and $dist(v,\omega)$ measures the robot's distance from the nearest obstacles. The parameters $\alpha'$, $\gamma'$ and $\beta$ are the weights to control the effect of three evaluation functions on the score function. $\sigma \in [0,1]$ is the scaling parameter. The optimal velocity vector $(v^*,\omega^*)$ is selected for execution among the $N_r$ velocity samples. Here, $(v^*,\omega^*)$ corresponds to the maximum value of $J(v,\omega)$ offered by equation (1).

PROBLEM FORMULATION: Online planning or offline learning based planning is the key for any successful navigation from a given position to another. Online planning suffers from repeated planning for minor positional modifications. Learning circumvents this repeated planning by learning the action (e.g., velocity vector) for the minor positional modifications. Unfortunately, existing learning algorithms either work in offline or requires a priori training data. The disclosed method 200 synergistically combines the planning (here DWA) and the learning (here the disclosed NBQ) algorithms.

The method 200: as depicted in FIG. 1B, blocks within the dotted section are generating one local goal. Local goal computation is done with the help of sensor's sensing range and global path (sequence of plurality of waypoints from start position of the robot to goal) offered by the global path planner. Input to the global path planner is a 2D floor plan, start and goal location as shown in FIG. 1B. The main building blocks (marked as double lined blocks in FIG. 1B) of the method 200 are DWA (planning module), the disclosed NBQ (learning module) and one Q-tree (records Q-value of NBQ at each state-action pair). The block DWA for exploration refers DWA is planning with maximum possible velocity samples for exploration. On the other hand, the block DWA for exploitation refers DWA is planning with minimum number of velocity samples to exploit Q-tree. In any case, actuation by the DWA assists the NBQ to update Q-tree. Finally, the NBQ offers one optimal velocity sample for execution. Detail description of the disclosed method 200 is provided below after describing the methodology of local goal computation.

Local Goal Computation: Consider a sensor with sensing range of $r_{sensor}$. A local goal denoted by $I_g$ is computed for two situations. In situation 1, next waypoint say $P_1$ is within $r_{sensor}$ and in the situation equation 2, $P_1$ is outside of $r_{sensor}$. For situation 1, $P_1$ is the local goal and is expressed by equation (2) below. For situation 2, a vector $OP_1$ between robot's current position, say, O and $P_1$ is formed. The unit vector corresponds to $OP_1$ is given by $\overrightarrow{OP_1}$. To obtain $I_g$ on the periphery of sensor, $r_{sensor}$ is multiplied by $\overrightarrow{OP_1}$ as expressed in equation (2).

$$I_g = P_1, \text{ For Situation 1}, \qquad\qquad \text{equation (2)}$$
$$= r_{sensor}\overrightarrow{OP_1}, \text{ For Situation 2},$$

Wherein, computed $I_g$ is fed into the DWA for local planning. The DWA selects one velocity vector among multiples for execution, which corresponds to the maximum score.

Next Best Q-learning (NBQ): In the learning algorithm NBQ, Q-value at a state due to an action is the summation of immediate reward and the Q-value corresponds to the next best action at the said state. This process continues recursively to update Q-values at each state for various actions. The immediate reward in NBQ is adapted based on the pruned score function, i.e., score without considering changes of static object/obstacle in the world ($\beta \times dist(v,\omega)$) as shown in equation (3) below. Motivation of pruning score function is to deal with the environmental amendments by NBQ and acts in real-time. The computed Q-values are recorded for future reference.

$$\hat{J}(v, \omega) = \sigma \times (\alpha' \times \text{angle}(v, \omega) + \gamma' \times \text{velocity}(v, \omega)) \qquad \text{equation (3)}$$

Like Q-learning, in the disclosed NBQ, selection of state, action and design of reward function are very important. Hence, the said parameters are discussed in the subsequent sections.

Figure 3A:
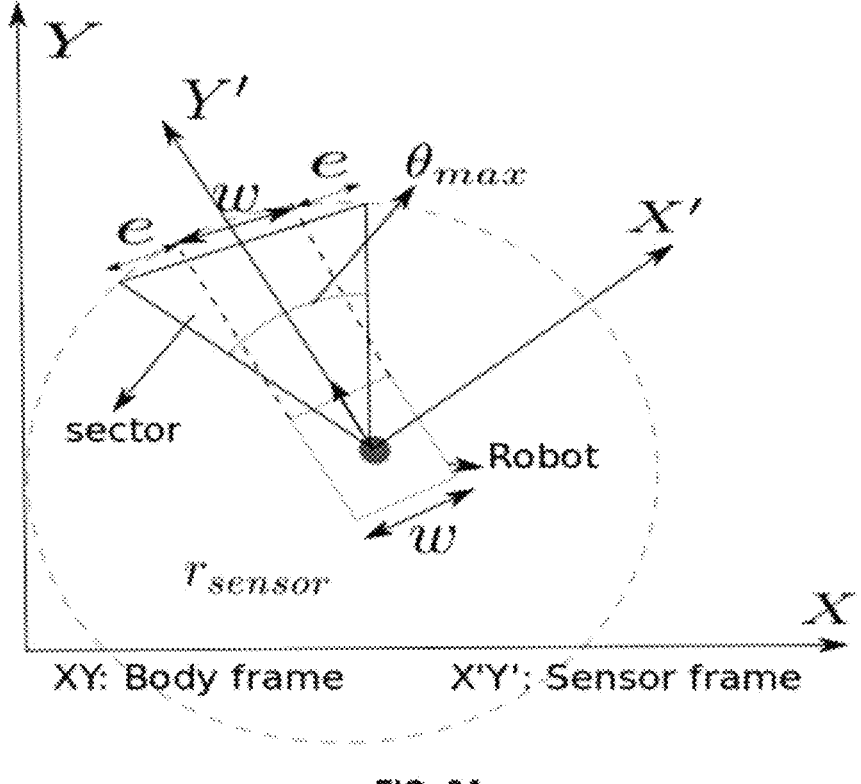
FIG. 3A depicts geometric representation for local goal computation by the robotic agent for a sensing range of an attached sensor, in accordance with some embodiments of the present disclosure.
Figure 3B:
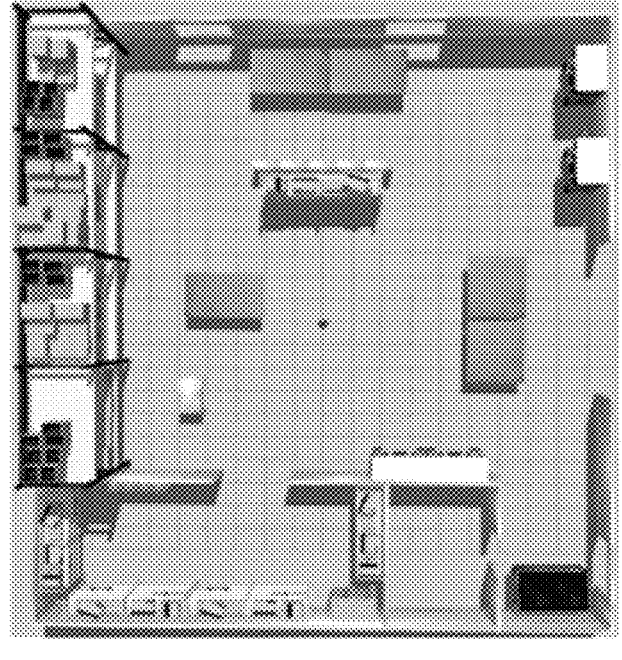
Figure 3B:
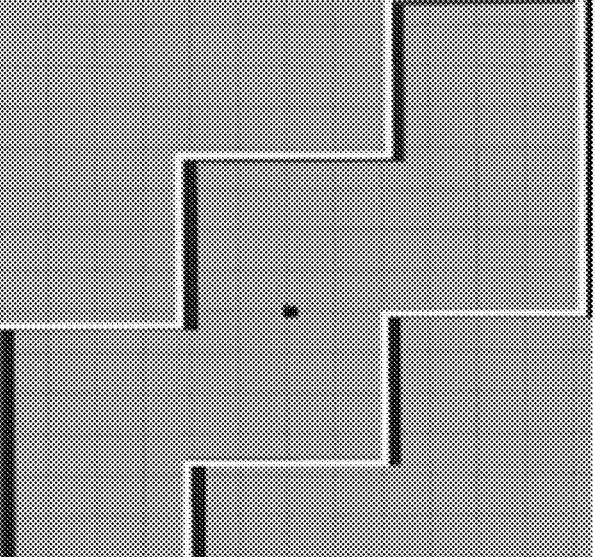

1) State: State is denoted by $s=<q_k,v_a,\omega_a>$, where $q_k$ is the sector within sensing range and $(v_a,\omega_a)$ is the robot's current velocity vector. Each $(v_a,\omega_a)$ falls within one among multiple discrete ranges defined over $V_r$ (feasible velocity space). To define $q_k$, the entire sensing range is equally partitioned into a number of regions, where each region is one sector. Say, the horizontal sensing range $\alpha_h$ is equally partitioned into n number of sectors denoted by $q_k, k \in [1, \ldots, n]$. Each $q_k$ lies between angle $\theta_{k-1}$ and $\theta_k, k \in [1, \ldots, n]$. Angle covered by $q_k$ is $(\theta_k - \theta_{k-1})$, here $\theta_k > \theta_{k-1}$. The maximum angle covered by $q_k$ is denoted by $\theta_{max}$, and is shown in FIG. 3A, where w is the robot's width. Now $\theta_{max}$ is expressed by equation (4), where 'e' is the clearance. Robot needs at least w unit arc length with a clearance of e on both sides to navigate as shown in FIG. 3A.

$$\theta_{max} = \frac{w+2e}{r_{sensor}}, \qquad \text{equation (4)}$$

where $r_{sensor}$ is the sensing range of sensor. Total number of sector n within $\alpha_h$ is given by equation (5).

$$n = \frac{\alpha_h}{\theta_{max}} \qquad \text{equation (5)}$$

2) Action: Let action $a \in A$ at state (s) is $<v,\omega>$, where v and $\omega$ are the linear and angular velocities respectively offered by the DWA satisfying the condition 1, condition 2 and condition 3 at current state to reach next state.

3) Reward: It is apparent from equation (3) that the pruned score is function of action $a=<v,\omega>$ only. The action a is executed from a state, say 's' Naturally, the score value offered by (3) because of the same 'a' from another state (say 's') are not identical. This infers that the score value offered by equation (3) is the function of both s and a, i.e., $\hat{\jmath}(s=<q_k,v_a,\omega_a>,a=<v,\omega>)$ is equivalent to $\hat{\jmath}(a=<v,\omega>)$ at s. Let us consider $\hat{\jmath}(s,a*)$ be the score at state 's' because of optimal action a*.

$$\hat{\jmath}(s, a*) = \frac{max}{\forall a}\hat{\jmath}(s, a) \qquad \text{equation (6)}$$

Now, with equation (3) and equation (6) above, one immediate reward, r(s,a) at state (s) because of action a is expressed by equation (7) below.

$$r(s, a) \quad = r_{max} \in \mathbb{R}^+ \hat{\jmath}(s, a*) \geq \hat{\jmath}(s, a*), \qquad \text{equation (7)}$$

$$= 0, \text{ if } \hat{\jmath}(s, a*) < \hat{\jmath}(s, a*),$$

$$= -r_{max}, \text{ if static object/obstacle detected,}$$

where, $\mathbb{R}^+$ denotes set of all positive real numbers. The r(s,a) as expressed by equation (7) is employed to update Q-value in the disclosed NBQ.

4) Next Best Q-Learning (NBQ)-value: Let, Q-value at s because of an action a is denoted by Q(s,a). In the disclosed NBQ, Q(s,a) adapts according to the variation of r(s,a). The value of r(s,a) varies with the variation of $\hat{\jmath}(s,a)$ which is equivalent to the score offered by equation (3). Motivated by the traditional Q-learning rule, the disclosed NBQ updation rule is given below in equation 8

$$Q(s, a) \leftarrow (1-\alpha)Q(s, a) + \alpha[r(s, a) + \gamma NBQ(s, a)], \qquad \text{equation (8)}$$

where, $0 \leq \gamma < 1$, $0 < \alpha \leq 1$ are discounting factor and learning rate, respectively. NBQ(s,a) is the next best Q-value at (s,a) pair, and is computed as follows.

1) Receive score, $\hat{\jmath}(s,a)$ from DWA at (s,a)
2) Find next best score of $\hat{\jmath}(s,a)$, say $\hat{\jmath}(s,a') > \hat{\jmath}(s,a)$
3) Get action corresponds to $\hat{\jmath}(s,a')$, i.e., a'
4) Obtain Q-value at (s,a') from Q-tree, i.e., Q(s,a')
5) If Q(s,a')>0, then NBQ(s,a)=Q(s,a')

NBQ-value is not updated if Q(s,a)≤0, because this leads the robot to an obstruction.

Thus, the method 200 using the SLPA-SR approach reduces frequency of invoking DWA as learning progresses, which indeed beneficial for real-time planning. For planning at s, the optimal action a* is computed by equation (9) below. However, if any feasible action is not found, then DWA is invoked for exploration.

$$a* = \frac{argmax\ Q(s, a)}{\forall a} \qquad \text{equation (9)}$$

5) Balancing Exploration and Exploitation in NBQ: The DWA acts as an actuator in the disclosed NBQ. Actuation of DWA depends on the number of velocity samples selected from the dynamic window. An attempt is made to design an expression, which can compute the number of velocity samples by tuning one scalar parameter (c). Hence, unlike DWA described earlier, here number of velocity samples $n_r(s)=n_{vr}(s) \times n_{\omega r}(s)$ at each state (s) is computed, where $n_{vr}(s)$ and $n_{\omega r}(s)$ are the linear and angular velocity samples respectively. The expression for $n_{vr}(s)$ and $n_{\omega r}(s)$ respectively are given by equations (10) and (11) below. In equation (10) and equation (11) $v_{init}$ and $\omega_{init}$ are the initial linear and angular velocity sample count for DWA respectively. Also $(f_v+v_{init})=N_{vr}$, $(f_\omega+\omega_{init})=N_{\omega r}$ and $N_{vr} \times N_{\omega r}=N_r$. Gradually $v_{init}$ and $\omega_{init}$ exponentially decrease with the value of x(s), where x(s) is the number of times the robot visits the state (s). Finally, with the increase of x(s) the value of $n_{vr}(s)$ and $n_{\omega r}(s)$ converges to $0<f_v<v_{init}$ and $0<f_\omega<<\omega_{init}$ respectively to keep exploring nature of the disclosed NBQ at s.

$$n_{vr}(s) = f_v + v_{init} \times e^{-c*x(s)}, \qquad \text{equation (10)}$$

$$n_{wr}(s) = f_w + w_{init} \times e^{-c*x(s)}, \qquad \text{equation (11)}$$

where $c \in [0,1]$ is the scalar parameter required to tune $n_{vr}(s)$ and $n_{\omega r}(s)$. The value of c is responsible for maintaining a balance between exploration and exploitation. In the absence of any path, the value of c is set to 0 for exploration and $0<c<1$ for exploitation. It is apparent from the above discussion that in the initial phase of learning robot explores more and exploits less. As learning progresses robot learns with less exploration and higher exploitation. This offers a balanced exploration and exploitation for the disclosed NBQ.

6) Convergence of NBQ: Explained below are few theorems with proofs.
   i. Theorem 1 (deals with the convergence of the disclosed NBQ)—The disclosed NBQ converges at each state action pair as time $t \rightarrow \infty$.
   Proof: Let, $Q_t(s,a)$ be the actual Q-value at (s,a) after t iteration and after infinite iteration $Q_t(s,a)$ attains true Q-value, i.e., Q(s,a). The error in Q-value at (s,a) after t iteration is given by $\Delta_t(s,a)$. Assumption 4.1 is made to establish converge of the disclosed NBQ.
Assumption 1 of theorem 1: The actual and true value of r(s,a) at an iteration for any environmental condition are identical.

$$\Delta_t(s, a) = |Q_t(s, a) - Q(s, a)| \qquad \text{equation (12)}$$

$$= |(1 - \alpha)((Q_{t-1}(s, a) - Q(s, a)) + \\ \alpha(r_{t-1}(s, a) - r(s, a)) + \alpha\gamma(NBQ_{t-1}(s, a) - \\ NBQ(s, a))|[\text{By equation (8)}]$$

$$= |(1 - \alpha)(Q_{t-1}(s, a) - Q(s, a)) + \alpha\gamma(NBQ_{t-1}(s, a) - \\ NBQ(s, a))|[\text{by Assumption 1 of theorem 1 and} \\ \text{equation (7)}] \le (1 - \alpha)|(Q_{t-1}(s, a) - Q(s, a))| + \\ \alpha\gamma|(NBQ_{t-1}(s, a) - NBQ(s, a))|[ \because |a + b| \le |a| + |b|]$$

$$= (1 - \alpha)|(Q_{t-1}(s, a) - Q(s, a))| + \\ \alpha\gamma|(Q_{t-1}(s, a') - Q(s, a')|[\text{say } Q_{t-1}(s, a') = \\ NBQ_{t-1}(s, a) \text{ and } Q(s, a') = NBQ(s, a)]$$

$$= (1 - \alpha)\Delta_{t-1}(s, a) + \alpha\gamma\Delta_{t-1}(s, a').[\text{say, } \Delta_{t-1}(s, a) = \\ |(Q_{t-1}(s, a) - Q(s, a))| \text{ and } \Delta_{t-1}(s, a') = \\ |(Q_{t-1}(s, a') - Q(s, a'))|$$

It is apparent from equation (12) that $\Delta_t$ is separated into two parts: $\Delta_{t-1}(s,a)$ and $\Delta_{t-1}(s,a')$. It is also apparent from equation (12) that in each iteration $\Delta_{t-1}(s,a)$ is getting multiplied by a factor $0 \le (1-\alpha) < 1, \because 0 < \alpha \le 1$. Now, say at first iteration maximum error contribution for the first part at (s,a) is $\Delta_0(s,a)$. Then after t iteration one can write that $$\Delta_t(s, a) = (1 - \alpha)^t \Delta_0(s, a). \qquad \text{equation (13)}$$

As $t \to \infty$, $\Delta_t(s,a) \to 0$. Similarly, $\alpha\gamma\Delta_{t-1}(s,a')$ can be expressed for (s,a'), and similar inference can be made as done in equation (13) $\because 0 \le \gamma < 1$ and $0 < \alpha \le 1$. Hence, the disclosed NBQ converges $\forall(s,a)$ with zero error as $t \to \infty$.

The method 200: As depicted in FIG. 1B and steps of FIG. 2, the method 200 computes global path offered by A* using start, goal positions and 2D floor plan as inputs. After that, robot attempts to visit each waypoint offered by the A* from robot's current position, say p. To visit one waypoint robot needs to evaluate corresponding $I_g$ and associated $q_k$. Then current state, $s = \langle q_k, v_a, \omega_a \rangle$ is formed. From s, robot attempts to compute a* by equation (9). In case, a*=$\emptyset$, robot attempts for pure exploration setting c=0. For a*$\neq\emptyset$, robot starts exploitation setting 0<c<1. Based on the value of c, $n_{vr}(s)$ and $n_{\omega r}(s)$ are computed and fed into the DWA for actuation. Because of this actuation (say a) $\hat{p}$(s,a), r(s,a) and Q(s,a) are updated. Finally, a* is recomputed for execution at s. The updated p is compared with the waypoint offered by A* and this whole process is repeated. Pseudo-code1 is provided below for the method 200.

| Pseudocode 1 implementing the SLPA-SLR: |
| --- |
| Input: $\mathbb{M} \leftarrow$ 2D, floor plan, $f_v$, $f_\omega$, $v_{init}$, $\omega_{init}$, constant c $\epsilon$ [0,1) $\leftarrow$ tolerance, $s_g$ $\leftarrow$goal position; Output: Optimal velocity vector, a*; Initialize: p $\leftarrow$current position; $\{pt_1,...,pt_n\} \leftarrow$ A*(p,$s_g$,$\mathbb{M}$)[from equation 4]; for waypoint $\epsilon$ $\{pt_1,...,pt_p\}$ do    while \|\|p − waypoint\|\| $\geq \epsilon$ do       Evaluate $l_g$ for waypoint by equation (2);       Determine sector $q_k$ based on the $l_g$;       Form current state, s =$\langle q_k$, $v_a$, $\omega_a \rangle$; /* ($v_a$, $\omega_a$) is the current velocity vector */ |

-continued

| Pseudocode 1 implementing the SLPA-SLR: |
| --- |
|       Compute a* by equation (9) at s; /* a* = (v,$\omega$) is the velocity vector satisfying condition1, 2 and 3 */       if a* == $\emptyset$ then          Set c $\leftarrow$ 0; // DWA for exploration       end       if a* $\neq \emptyset$ then          Set 0 < c < 1;// DWA for exploitation       end       Compute $n_{vr}(s)$ by (10) & $n_{\omega r}(s)$ by equation (11);       [a,$\hat{p}$(s, $\alpha$)] = DWA(s,$l_g$,$n_{vr}(s)$,$n_{\omega r}(s)$,.) equation [15];       Evaluate r(s,a) by equation (7);       Update Q(s,a) by equation (8);       Recompute a* by equation (9) at s and execute;       Update p $\leftarrow$current position;    end end |

ANALYSIS: The SLPA-SR implemented by the method 200 is analyzed in terms of computational cost by considering DWA as proposed in D. Fox, W. Burgard, and S. Thrun, "*The dynamic window approach to collision avoidance*," IEEE Robotics & Automation Magazine, vol. 4, no. 1, pp. 23-33, 1997 as the contender algorithm. Computational cost for one optimal velocity vector generation at state (s) by The SLPA-SR involves computation cost for the planner (DWA) and computation cost for the learner (NBQ). The cited DWA involves $n_r(s)$ score computation (pruned score offered by equation (3)) and compares ($n_r(s)-1$) scores to evaluate the best score. Here, $n_r(s)$ is the number of velocity samples chosen from dynamic window at state (s). In the disclosed NBQ-learning, robot computes NBQ-values with maximum of ($N_r(s)-1$) number of score comparison and finally, selects the optimal velocity vector by doing maximum ($N_r(s)-1$) number of Q-value comparisons. Here, $N_r(s)$ is the maximum value of $n_r(s)$. Say, $t_l(s)$ be the computational cost for one time optimal velocity vector generation by the SLPA-SR at s and based on the above discussion $t_l(s)$ is expressed below.

$$t_l(s) = O(n_r(s)t_s) + O(n_r(s) - 1) + O(2(N_r(s) - 1)), \qquad \text{equation (14)}$$

$$\text{planning learning}$$

$$\approx O(n_r(s)t_s) + O(n_r(s)) + O(N_r(s)),$$

where $t_s$ is the one time score computation cost by DWA following equation (3) at state (s). On the other hand, computation cost for generating optimal velocity vector by DWA with N/(s) velocity vector at s is given by:

$$t_p(s) = O(N_r(s)t'_s) + O(N_r(s) - 1), \qquad \text{equation (15)}$$

$$\approx O(N_r(s)t'_s) + O(N_r(s)),$$

$$\approx O(N_r(s)t'_s) \text{ [worst case scenario]}$$

where $t'_s > t_s$ be the one time score computation cost at state (s) by DWA following equation (1). It is apparent from equation (10) and equation (11) that at s at t=0 with x(s)=0, $n_{vr}(s) = (f_v + v_{init}) = N_{vr}(s)$ and $n_{\omega r}(s) = (f_\omega + \omega_{init}) = N_{\omega r}(s)$. Hence, $n_r(s) = N_{wr}(s) \times N_{\omega r}(s) = N_r(s)$. Now, by equation (14), $$t_l(s) \quad \approx O(N_r(s)t_s) + O(N_r(s)), \; [\because n_r(s) = N_r(s) \text{ at } r = 0] \quad \text{equation (16)}$$

$$\approx O(N_r(s)t_s), \text{ [worst case scenario]}$$

$$< t_p(s). \text{ [By equation (15) and } \because t_s' > t_s \qquad 5$$

Again referring (10) and (11), as t→∞, with the increase in x(s) the value of $n_r(s)$ converges to $f_v f_\omega \ll N_r$. Again, by equation (14), $$t_l(s) \quad \approx O(f_v f_\omega t_s) + O(f_v f_\omega) + O(N_r(s)), \qquad \text{equation (17)}$$

$$\approx O(f_v f_\omega t_s) + O(N_r(s)), \text{ [worst case scenario]}$$

$$\approx O(N_r(s)), \text{ [worst case scenario]}$$

$$< t_p(s). \text{ [By equation (15)]}$$

Hence, it can be concluded that $t_l(s) < t_p(s)$ at s.

SIMULATION AND EXPERIMENT: Demonstrated are simulation and experimental results in three steps. First step simulates the SLPA-SR and contender (DWA) algorithm in a zigzag environment (world 1) of dimension 16 m×13 m with lane width of 3.5 m using TurtleBot3 Waffle Pi™. The simulation is performed using *Turtlebot3: Robot simulation made easy*, (last accessed 16 Feb. 2023). [Online]. Available: https://www.turtlebot.com/about/. Second step is about simulation of the disclosed The method 200 and DWA, in a typical warehouse environment (world 2) of dimension 30 m×20 m using TurtleBot3 Waffle Pi. Finally, one real experiment is conducted using TurtleBot3 Waffle Pi™ in a zigzag environment (world 3) of dimension 3.6 m×2.4 m with lane width of 1.2 m by exploiting the learned Q-tree from world 2. Python implementation of DWA is taken from A. Sakai, D. Ingram, J. Dinius, K. Chawla, A. Raffin, and A. Paques, "*Pythonrobotics: a python code collection of robotics algorithms*," arXiv preprint arXiv:1808.10703, 2018. The performance metrics include average run-time, linear velocity, angular velocity, % of exploitation, average reward, state-action pair count. Performance metric linear velocity, angular velocity and average run-time are employed to confirm superiority of the disclosed The SLPA-SR over the contender algorithm (DWA). Remaining performance metrics are employed to establish efficacy of the SLPA-SR.

Setup:

1) Simulation: Simulation of Pseudocode 1 is conducted in a workstation with an Intel Core i7-9700K CPU@ 3.60 GHz*8 Processor™ and 16 GB of RAM having Ubuntu 20.04.4 LTS™ as operating system. Pseudocode 1 is implemented using Python 3.8 and simulated on Robot Operating System (ROS) Noetic™ with Gazebo™ for TurtleBot3 Waffle Pi™. TurtleBot3 Waffle Pi™ is equipped with 360° 2D LiDAR to perceive real-time uncertainties from the world. Over the iteration uncertain obstacles are introduced randomly in (a) world 1 (zigzag) and (b) world 2 (typical warehouse) of FIG. 3B. An inflation of 0.2 m is considered for simulation. Velocity and acceleration ranges are ±0.2 m/sec and ±0.5 m/sec², respectively. Following parameters are set in Pseudocode 1 for simulation: $f_v$=20, $f_\omega$=3, $v_{init}$=100, $\omega_{init}$=10, c=0.05 for exploitation using DWA, $\in$=0.5 m, α=0.1, γ0.9, α'=15, γ'=0.9, Δt=3 sec, σ=0.83 and clarence e=0.2.

2) Experiment: Hardware experiment is conducted using TurtleBort3 Waffle Pi™. TurtleBort3 Waffle Pi™ is equipped with one 36° 2D LiDAR. During navigation, real-time uncertainties are communicated with a ground station using one ad hoc wireless network. Ground station sends command velocities, computed by the disclosed The method 200 or DWA to the TurtleBort3 Waffle Pi, via said wireless network. TurtleBot3 Waffle Pi receives command velocities through connecting the WiFi of Raspberry Pi™ (mounted on TurtleBot3 Waffle Pi™) to the said ad hoc WiFi network. Localization of the TurtleBort3 is done using OptiTrack-Motion Capture Systems™. The pseudocode 1 employs same parameter setting for real-time experiment as employed in simulation. During uncertain obstacle avoidance velocity range is reduced to ±0.1 m/sec from ±0.2 m/sec. Also, an inflation of 0.25 m is considered for hardware experiments.

Procedure:

1) Simulation: Description of the performance metric are given below. Average run-time for Pseudocode 1 {algo∈[DWA, SLPA-SR]} is computed by equation (18) below. To compute average run-time, start, goal locations in world 1, 2 are separately fixed and the simulations are repeated.

$$\text{Average run-time} = \frac{1}{\text{number of epoch}} \sum_{\forall epoch} t_{epoch}^{algo}, \qquad \text{equation (18)}$$

where $t_{epoch}^{algo}$ is the run-time required to reach from start to goal by algo∈[DWA, SLAP-SR], i.e., one epoch. An epoch is a finite time duration. Within that time the robot either reaches its goal and epoch terminated, or the time (or iterations) elapsed, and epoch completed. Linear velocity and angular velocity of algo∈[DWA, SLAP-SR] in each iteration are recorded for result.

The % of exploitation (% E) at an epoch in SLPA-SR is given by:

$$\% E = \frac{\text{number of states used exploitation}}{\text{total number of states}} \times 100\% \qquad \text{equation (19)}$$

During the simulation average reward in the SLPA-SR of the method 200 at an epoch is computed by taking average of Q-values at all state action pairs.

$$\text{Average reward} = \frac{1}{|S|} \frac{1}{|A|} \sum_{\forall s \in S} \sum_{\forall a \in A} Q(s, a), \qquad \text{equation (20)}$$

where S and A are the set of states and actions, respectively. In the SLPA-SR, number of state-action pair is incremental in nature with epoch (or iterations) and is shown in the result.

Figure 8:
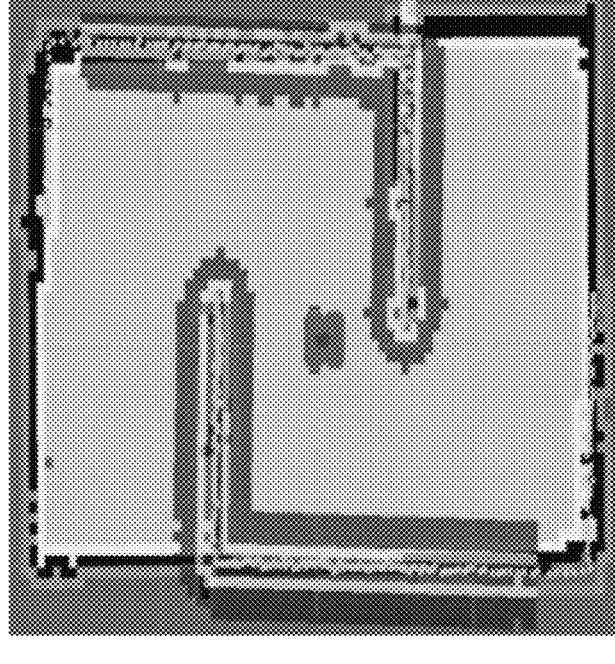
FIG. 8 depicts a third world and corresponding two dimensional (2D) local cost map for the experiments on the TurtleBot3 Waffle Pi™ robotic agent implementing the simultaneous local path planning and learning of the method of FIG. 2, in accordance with some embodiments of the present disclosure.

2) Experiment: For hardware experiment using TurtleBot3 Waffle Pi™, one 2D floor plan of world 3 (depicted in in FIG. 8 (*a*)) is created at the beginning of experiments using 360° 2D LiDAR equipped with the TurtleBot3 Waffle Pi™. The 2D floor plan is fed into Pseudocode 1. Q-tree, learned by TurtleBot3 Waffle Pi™ during simulation on world 2 of FIG. 3C, is imported to TurtleBot3 Waffle Pi™ for hardware experiment on world 3 of FIG. 8. Randomly static obstacle is placed on world 3 while navigating using TurtleBot3 Waffle Pi. FIG. 8 (*b*) depicts 2D local cost map of world 3 for experiments. TurtleBot3 Waffle Pi is placed at the origin of world 3

TABLE I

| | | | Randomly placed obstacle | Epoch | Algo | Average run-time (sec) |
|---|---|---|---|---|---|---|
| World | Start | Goal | | | | |
| 1 | (0, 0) | (3, 6) | 0 | 60 | DWA | 32.9907 |
| | | | | | method 200 (SLPA-SR) | 31.5132 |
| 2 | (0, 0) | (10, 6) | 1 | 10 | DWA | 50.7337 |
| | | | | | method 200 | 48.5605 |
| | (0, 0) | (10, −6) | 1 | 10 | DWA | 54.4768 |
| | | | | | method 200 | 50.7555 |
| | (0, 0) | (−10, 6) | 2 | 10 | DWA | 53.8211 |
| | | | | | method 200 | 52.3395 |
| | (−10, 6) | (−10, −4) | 3 | 10 | DWA | 82.3827 |
| | | | | | method 200 | 80.1633 |
| | (−10, −4) | (10, −6) | 3 | 10 | DWA | 79.6911 |
| | | | | | method 200 | 77.2029 |
| | random | random | 7 | 10 | DWA | 55.1072 |
| | | | | | method 200 | 54.1522 |

Experimental Results for TurtleBot3 Waffle Pi™.

Figure 4:
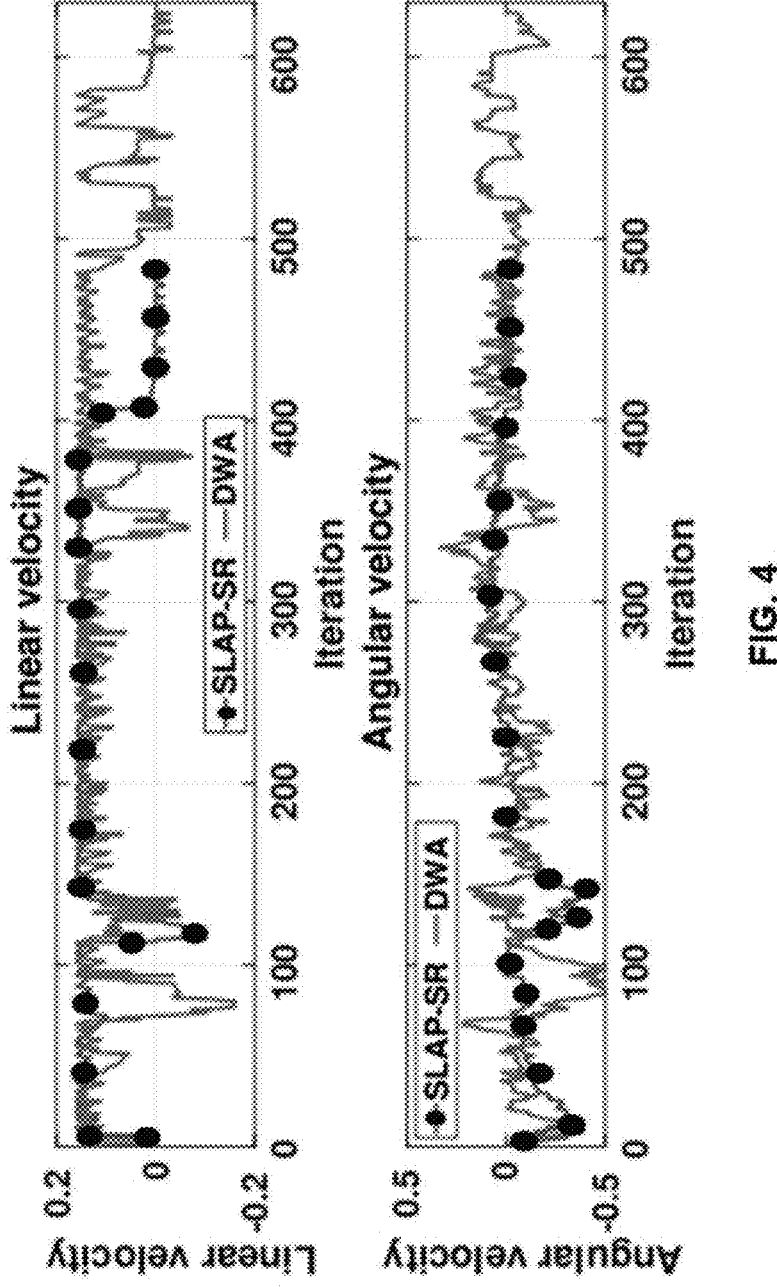
FIGS. 4 through 7, and FIG. 9 depict simulation and experimental results for TurtleBot3 Waffle Pi™ robotic agent implementing the simultaneous local path planning and learning of the method of FIG. 2, in accordance with some embodiments of the present disclosure.
Figure 5:
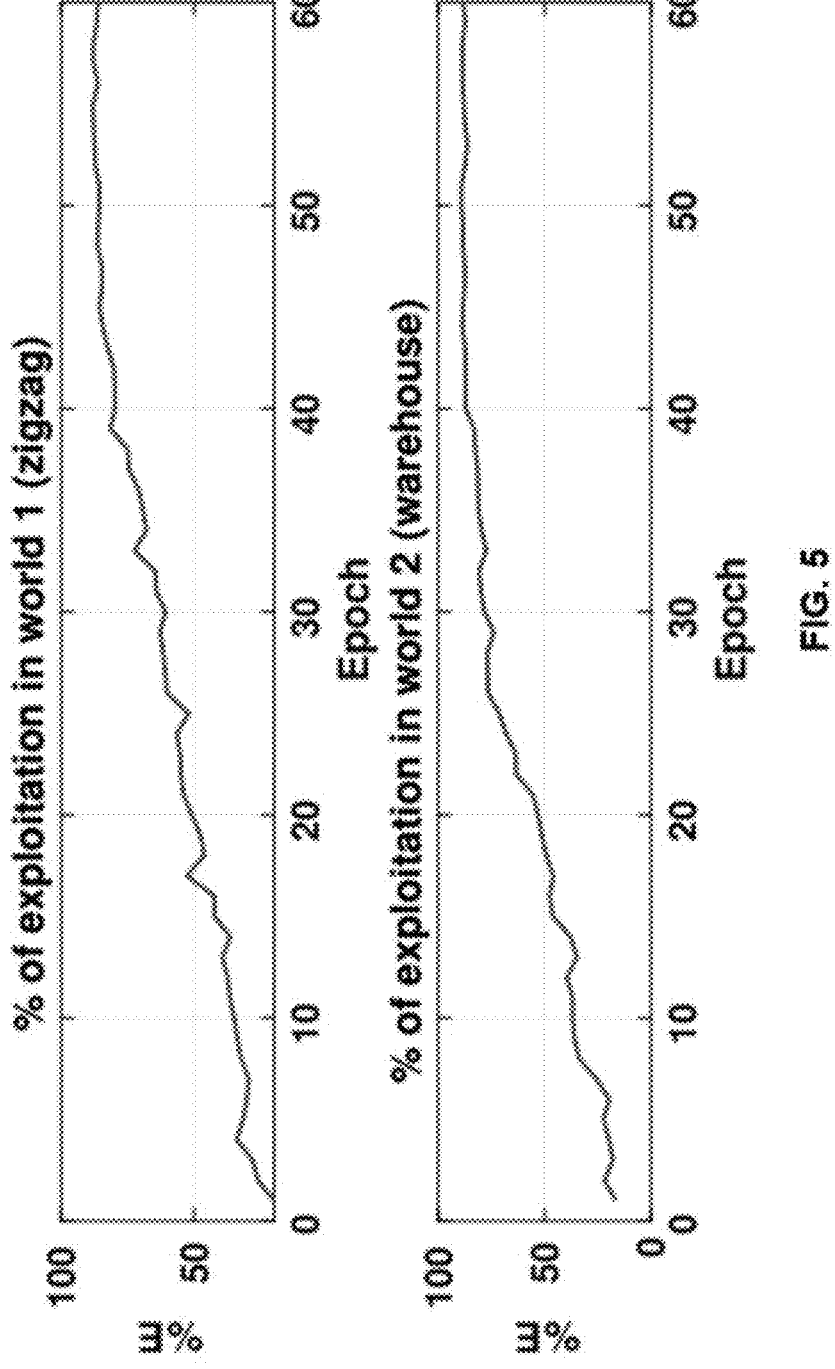
Figure 6:
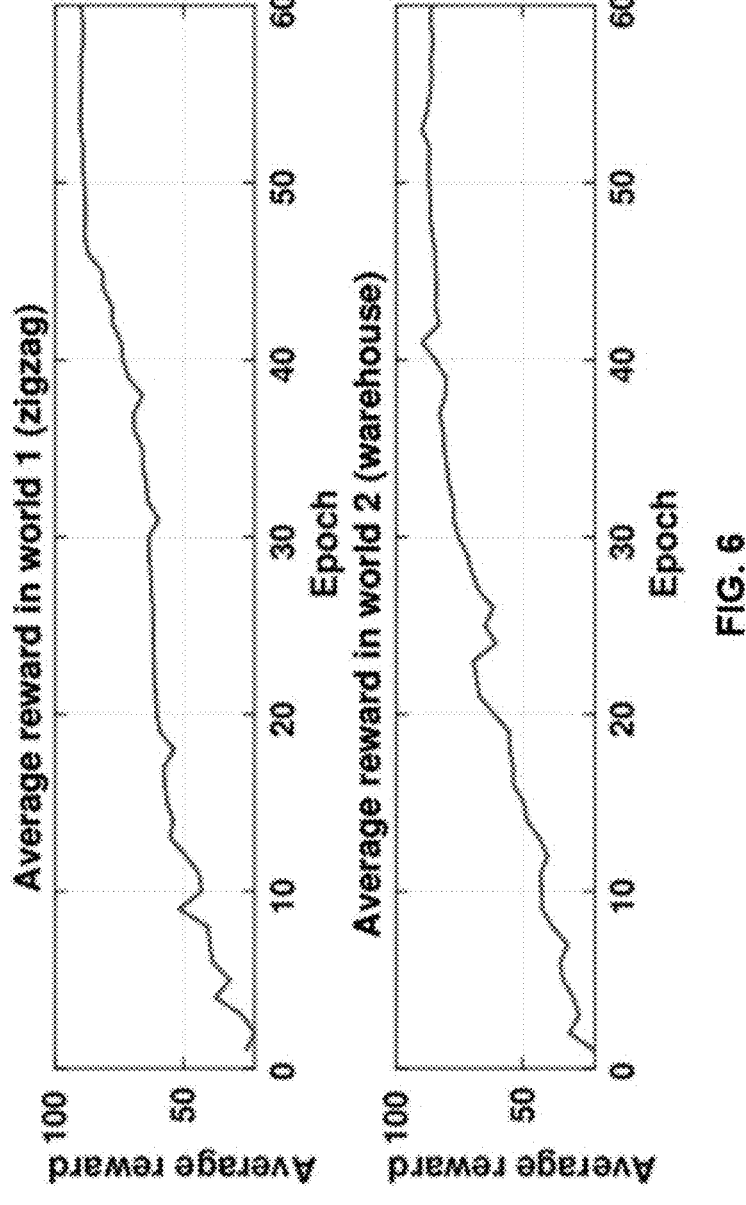
Figure 7:
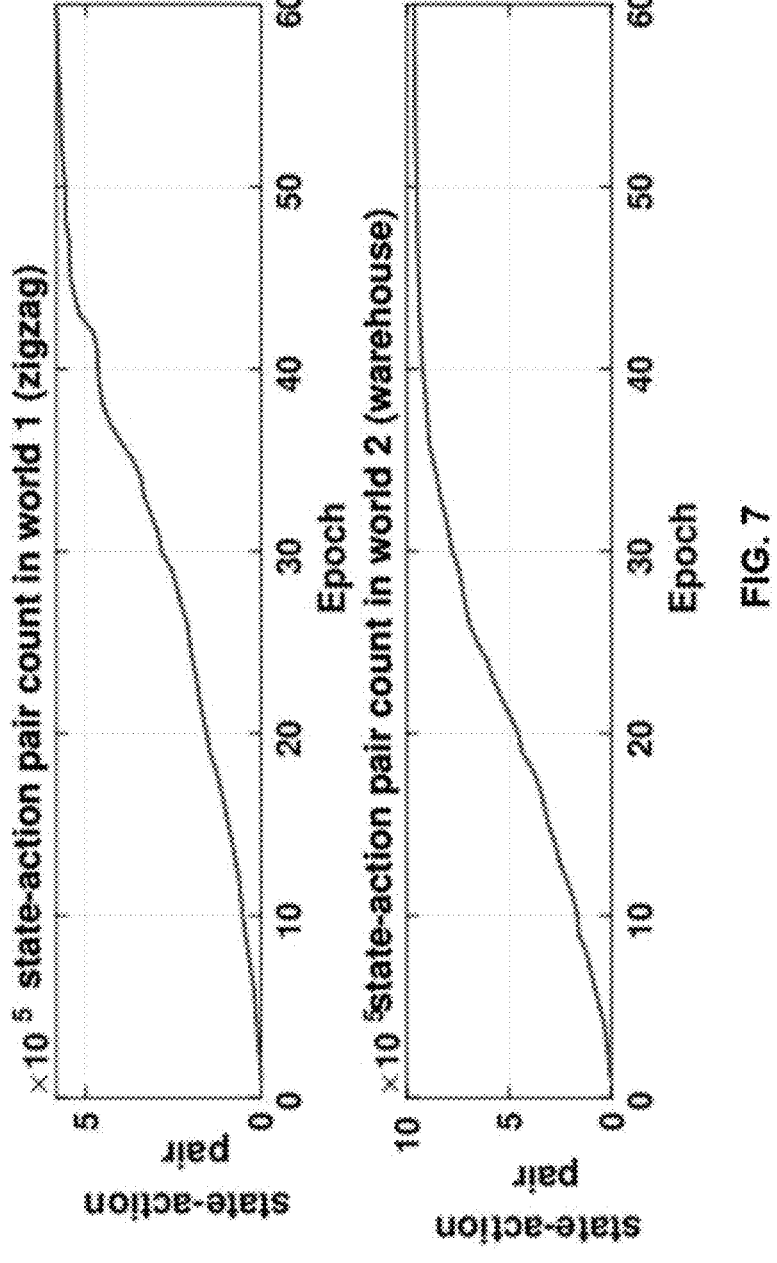

1) Simulation: Table I above lists average run-time for simulations conducted with the TurtleBot3 Waffle Pi in world 1 and 2. It is apparent from Table I that the disclosed method 200 (SLPA-SR) is outperforming the contender algorithm (i.e., DWA) in terms of average run-time for both world 1 and 2. In world 1, the method 200 is tested with one pair of start-goal without any obstacle for 60 epochs. In world 2, the method 200 is tested with six sets of start-goal pairs. For each start-goal pair, after 5 epochs static object/obstacle is placed randomly on global path. The remaining five epochs are tested with the randomly placed static object/obstacle as shown in Table I. Table I is also supporting equations (16) and (17). FIG. 4 shows the variation of linear and angular velocities (at 7th epoch) of TurtleBot3 Waffle Pi™ during simulation in world 2 with (0,0) as start and (10,6) as goal locations and one randomly placed obstacle. It is apparent from FIG. 4 that the disclosed The method 200 is offering better velocity profiles compared to the same by the DWA. It is also apparent from FIG. 4 that The method 200 has reached goal in less time compared to the same by DWA. FIG. 4 again validates equations (16) and (17). The plot for % of exploitation (% E) is shown in FIG. 5. It is apparent from FIG. 5 that the % of exploitation is monotonically increasing in nature with epoch. As count of exploitation is increasing, it can be inferred that the usage of planner (i.e., DWA) is decreasing with the increase in number of epochs. Average reward is also monotonically increasing in nature with epoch as shown in FIG. 6 for both world 1 and 2. Monotonic increment in state-action pair's count in the disclosed NBQ is also shown in FIG. 7 for both world 1 and 2.

Figure 9:
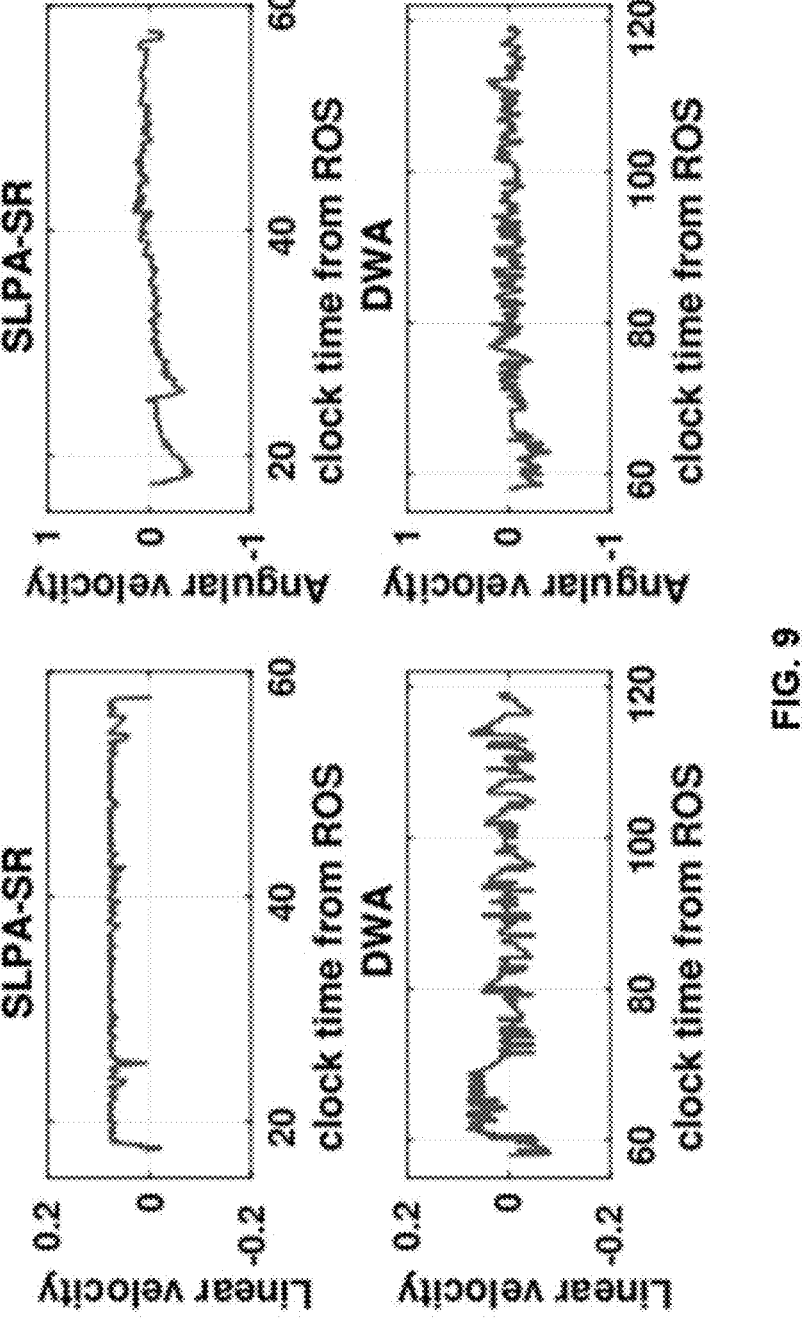

2) Experiment: FIG. 8 (*a*) shows the world 3 for experiment and FIG. 8 (*b*) shows 2D local cost map of world 3. FIG. 9 shows the real-time velocity plots from hardware experiments for the method 200 and DWA. It is apparent from FIG. 9 that the disclosed method 200 is offering better velocity profile compared to the same by DWA. Also, the method 200 is taking less time compared to the DWA to reach the goal.

Unlike the exiting approaches that have a technical limitation of not able to perform planning and learning simultaneously in real-time, the method and system disclosed herein provides dynamic nature of the NBQ disclosed herein, i.e., number of state-action pair is dynamic in the Q-tree. Further, provides balancing of exploration-exploitation in the NBQ with ability to deal with environmental uncertainties.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A method for robot navigation, the method further comprising:

performing by a robotic agent executed by one or more hardware processors, a global path planning to obtain a plurality of way points to reach a goal position based on a current position, the goal position and two-dimensional floor plan of an environment the robotic agent is deployed into, wherein the current position of the robotic agent represents a current way point; and sequentially navigating by the robotic agent, through each of the plurality of way points to reach the goal position by simultaneously applying a) a Dynamic Window Approach (DWA) for a local path planning, and b) a Next best Q-learning (NBQ) approach that enables real-time learning while balancing between an exploitation approach and an exploration approach, wherein sequentially navigating through each of the plurality of way points to reach the goal position comprises iteratively performing a plurality of steps until the plurality of way points are covered, the plurality of steps further comprising:

a) computing an optimal velocity vector for a local goal evaluated for the current way point at a current state among a plurality of states visited by the robotic agent;

b) employing by the robotic agent, one of an exploration approach and an exploitation approach for the local path planning based on the optimal velocity vector, wherein i) the exploration approach is followed if the optimal velocity vector is empty, wherein value of a scalar parameter, required to tune a number of linear velocity samples and a number of angular velocity samples, is set to zero during the exploration approach, and ii) the exploitation approach is followed if the optimal velocity vector is not-empty, wherein value of the tuning scalar parameter is set to be greater than zero and less than one during the exploitation approach;

c) computing the number of linear velocity samples and the number of angular velocity samples at each of the plurality of states based on value set for the scalar parameter;

d) obtaining the optimal velocity vector and a score value for each velocity sample offered by the DWA based on the current state, the local goal, the number of linear velocity samples, and the number of angular velocity samples;

e) evaluating a reward using a predefined reward function and updating a Q-value of a Q-tree, wherein dimension of the Q-tree in the NBQ is dynamically obtained without need to define a priori, wherein the Q-value adapts based on one or more uncertainties in the environment, wherein by the NBQ approach, the Q-value at the current state of the plurality of states due to an action is a summation of an immediate reward and a discounted next best Q-value, wherein the discounted next best Q-value is the Q-value corresponding to a next best action at the current state, wherein the Q-value is updated recursively at each state for the plurality of actions, wherein the immediate reward in the NBQ is adapted in accordance with a pruned score function that is a score without considering changes of a static obstacle in the environment as a product of a weight to control on the pruned score function and a distance between a nearest obstacle and robot's predicted path corresponding to linear velocity and an angular velocity; and f) recomputing the optimal velocity vector at the current state with the updated Q-tree and executing the optimal velocity vector to update the current waypoint by current position of the robotic agent.

2. The method of claim 1, wherein each of the plurality of states is a tuple further comprising a sector within sensing range of a sensor attached to the robotic agent, a current linear velocity of the robotic agent, and a current angular velocity of the robotic agent.

3. A robotic agent for robot navigation, the system further comprising:

a memory storing instructions;

one or more Input/Output (I/O) interfaces; and one or more hardware processors coupled to the memory via the one or more I/O interfaces, wherein the one or more hardware processors are configured by the instructions to:

perform a global path planning to obtain a plurality of way points to reach a goal position based on a current position, the goal position and two-dimensional floor plan of an environment the robotic agent is deployed into, wherein the current position of the robotic agent represents a current way point; and sequentially navigate through each of the plurality of way points to reach the goal position by simultaneously applying a) a Dynamic Window Approach (DWA) for a local path planning, and b) a Next best Q-learning (NBQ) approach that enables real-time learning while balancing between an exploitation approach and an exploration approach, wherein sequentially navigating through each of the plurality of way points to reach the goal position comprises iteratively performing a plurality of steps until the plurality of way points are covered, the plurality of steps further comprising:

a) computing an optimal velocity vector for a local goal evaluated for the current way point at a current state among a plurality of states visited by the robotic agent;

b) employing, by the robotic agent, one of an exploration approach and an exploitation approach for the local path planning based on the optimal velocity vector, wherein i) the exploration approach is followed if the optimal velocity vector is empty, wherein value of a scalar parameter, required to tune a number of linear velocity samples and a number of angular velocity samples, is set to zero during the exploration approach, and ii) the exploitation approach is followed if the optimal velocity vector is not-empty, wherein value of the tuning scalar parameter is set to be greater than zero and less than one during the exploitation approach;

c) computing the number of linear velocity samples and the number of angular velocity samples at each of the plurality of states based on value set for the scalar parameter;

d) obtaining the optimal velocity vector and a score value for each velocity sample offered by the DWA based on the current state, the local goal, the number of linear velocity samples, and the number of angular velocity samples;

e) evaluating a reward using a predefined reward function and updating a Q-value of a Q-tree, wherein dimension of the Q-tree in the NBQ is dynamically obtained without need to define a priori, wherein the Q-value adapts based on one or more uncertainties in the environment, wherein by the NBQ approach, the Q-value at the current state of the plurality of states due to an action is a summation of an immediate reward and a discounted next best Q-value, wherein the discounted next best Q-value is the Q-value corresponding to a next best action at the current state, wherein the Q-value is updated recursively at each state for the plurality of actions, wherein the immediate reward in the NBQ is adapted in accordance with a pruned score function that is a score without considering changes of a static obstacle in the environment as a product of a weight to control on the pruned score function and a distance between a nearest obstacle and robot's predicted path corresponding to linear velocity and an angular velocity; and f) recomputing the optimal velocity vector at the current state with the updated Q-tree and executing the optimal velocity vector to update the current waypoint by current position of the robotic agent.

4. The robotic agent of claim 3, wherein state is a tuple further comprising a sector within sensing range of a sensor attached to the robotic agent, a current linear velocity of the robotic agent, and a current angular velocity of the robotic agent.

5. One or more non-transitory machine-readable information storage mediums comprising one or more instructions which when executed by one or more hardware processors cause:

performing by a robotic agent executed by one or more hardware processors, a global path planning to obtain a plurality of way points to reach a goal position based on a current position, the goal position and two-dimensional floor plan of an environment the robotic agent is deployed into, wherein the current position of the robotic agent represents a current way point; and sequentially navigating by the robotic agent, through each of the plurality of way points to reach the goal position by simultaneously applying a) a Dynamic Window Approach (DWA) for a local path planning, and b) a Next best Q-learning (NBQ) approach that enables real-time learning while balancing between an exploitation approach and an exploration approach, wherein sequentially navigating through each of the plurality of way points to reach the goal position comprises iteratively performing a plurality of steps until the plurality of way points are covered, the plurality of steps further comprising:

a computing an optimal velocity vector for a local goal evaluated for the current way point at a current state among a plurality of states visited by the robotic agent;

b employing by the robotic agent, one of an exploration approach and an exploitation approach for the local path planning based on the optimal velocity vector, wherein i) the exploration approach is followed if the optimal velocity vector is empty, wherein value of a scalar parameter, required to tune a number of linear velocity samples and a number of angular velocity samples, is set to zero during the exploration approach, and ii) the exploitation approach is followed if the optimal velocity vector is not-empty, wherein value of the tuning scalar parameter is set to be greater than zero and less than one during the exploitation approach;

c) computing the number of linear velocity samples and the number of angular velocity samples at each of the plurality of states based on value set for the scalar parameter;

d) obtaining the optimal velocity vector and a score value for each velocity sample offered by the DWA based on the current state, the local goal, the number of linear velocity samples, and the number of angular velocity samples;

e) evaluating a reward using a predefined reward function and updating a Q-value of a Q-tree, wherein dimension of the Q-tree in the NBQ is dynamically obtained without need to define a priori, wherein the Q-value adapts based on one or more uncertainties in the environment, wherein by the NBQ approach, the Q-value at the current state of the plurality of states due to an action is a summation of an immediate reward and a discounted next best Q-value, wherein the discounted next best Q-value is the Q-value corresponding to a next best action at the current state, wherein the Q-value is updated recursively at each state for the plurality of actions, wherein the immediate reward in the NBQ is adapted in accordance with a pruned score function that is a score without considering changes of a static obstacle in the environment as a product of a weight to control on the pruned score function and a distance between a nearest obstacle and robot's predicted path corresponding to linear velocity and an angular velocity; and f) recomputing the optimal velocity vector at the current state with the updated Q-tree and executing the optimal velocity vector to update the current waypoint by current position of the robotic agent.

6. The one or more non-transitory machine-readable information storage mediums of claim 5, wherein the one or more instructions which when executed by the one or more hardware processors further cause a sector within sensing range of a sensor attached to the robotic agent, a current linear velocity of the robotic agent, and a current angular velocity of the robotic agent.

* * * * *